(12) United States Patent
Duval et al.

(10) Patent No.: US 6,419,043 B1
(45) Date of Patent: Jul. 16, 2002

(54) ELECTRICAL AND MECHANICAL STEERING SYSTEM FOR AUTOMOBILE VEHICLES

(75) Inventors: Benoit Duval; Laurent Gallou; Abdel Karim Ben Rhouma, all of Vendome (FR)

(73) Assignee: Nacam France SA, Vendome (FR)

( * ) Notice: Subject to any disclaimer, the term of this patent is extended or adjusted under 35 U.S.C. 154(b) by 0 days.

(21) Appl. No.: 09/572,653

(22) Filed: May 16, 2000

(30) Foreign Application Priority Data

May 17, 1999 (FR) .............................. 99 06320

(51) Int. Cl.[7] .................................. B62D 5/04
(52) U.S. Cl. ...................................... 180/444
(58) Field of Search ........................... 180/405, 406, 180/407, 444, 443, 402

(56) References Cited

U.S. PATENT DOCUMENTS

| | | | |
|---|---|---|---|
| 4,023,434 A | * 5/1977 | Axelsson | 180/444 |
| 4,421,495 A | 12/1983 | Kulischenko | |
| 4,570,734 A | * 2/1986 | Taig | 180/79.1 |
| 5,205,371 A | * 4/1993 | Karnopp | 180/444 |
| 5,275,250 A | 1/1994 | Müller et al. | |
| 5,598,897 A | 2/1997 | Sugiura | |
| 5,924,520 A | * 7/1999 | Ehara et al. | 180/444 |
| 5,941,339 A | * 8/1999 | Shimizu et al. | 180/444 |
| 5,951,031 A | * 9/1999 | Shimizu et al. | 280/93.502 |
| 5,996,723 A | * 12/1999 | Shimizu et al. | 180/444 |
| 6,006,853 A | * 12/1999 | Shimizu et al. | 180/444 |
| 6,053,273 A | * 4/2000 | Shimizu et al. | 180/444 |
| 6,112,844 A | * 9/2000 | Bohner et al. | 180/403 |
| 6,116,371 A | * 9/2000 | Suyama et al. | 180/444 |
| 6,138,788 A | * 10/2000 | Bohner et al. | 180/405 |
| 6,161,645 A | * 12/2000 | Tabata et al. | 180/444 |
| 6,209,677 B1 | * 4/2001 | Bohner | 180/406 |

FOREIGN PATENT DOCUMENTS

| | | | |
|---|---|---|---|
| DE | 42 06 773 A1 | | 9/1992 |
| DE | 197 14 297 A1 | | 11/1997 |
| DE | 197 37 383 A1 | * | 3/1998 |
| DE | 197 55 044 C1 | * | 3/1999 |
| EP | 0 755 845 A1 | | 1/1997 |
| EP | 0 985 591 A2 | * | 3/2000 |
| GB | 2 270 776 A | | 3/1994 |
| JP | 59-145662 | | 8/1984 |
| JP | 10-67330 | * | 3/1998 |
| JP | 10-194144 | * | 7/1998 |

\* cited by examiner

*Primary Examiner*—Richard Chilcot
*Assistant Examiner*—Andrew J. Fischer
(74) *Attorney, Agent, or Firm*—Lawrence E. Laubscher, Sr.

(57) ABSTRACT

An automobile vehicle steering system includes a steering column, a steering wheel and a steering rack for the steered wheels of the automobile vehicle. The steering column has an upper column part connected to the steering wheel and an intermediate column part connected to the steering rack for the steered wheels of the automobile vehicle. The intermediate column part consists of two connections, namely a mechanical connection and an electrical connection. The mechanical connection and the electrical connection are in parallel, so that the two connections are both connected to the end of the upper column part and to the steering rack and can function simultaneously under normal driving conditions. In the event of an electrical power failure the mechanical connection remains and is used to steer the automobile vehicle.

14 Claims, 8 Drawing Sheets

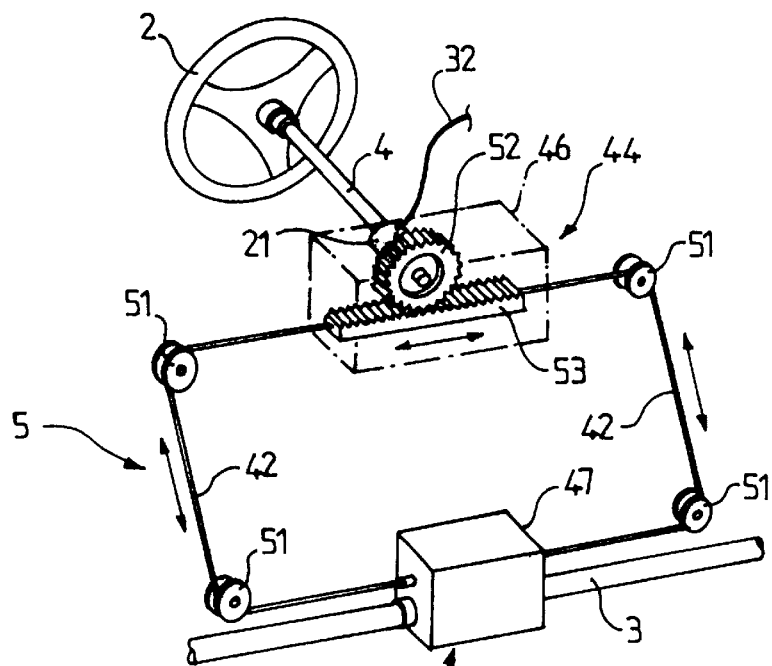
FIG. 4
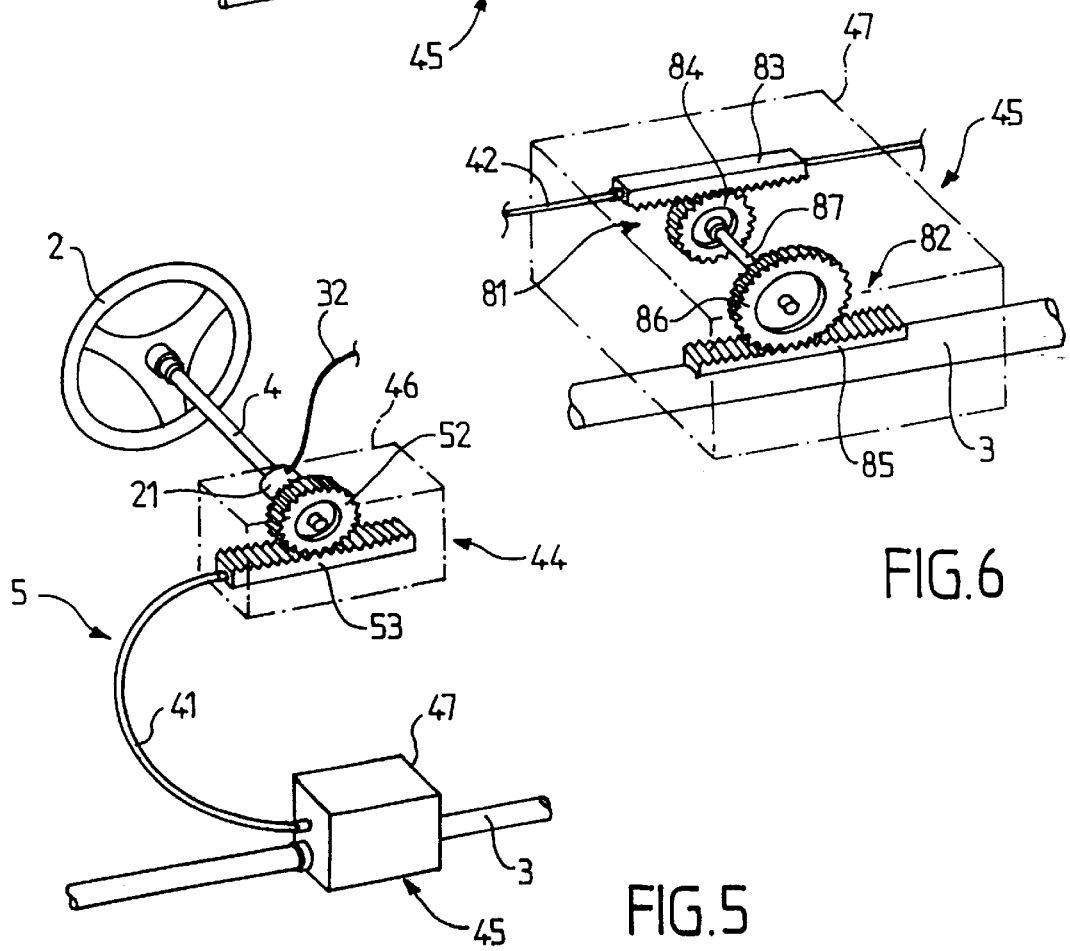
FIG. 6
FIG. 5

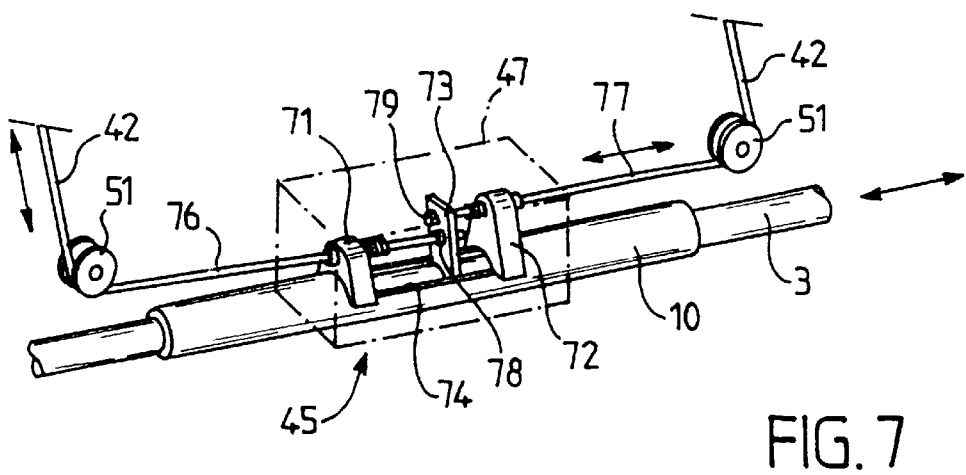
FIG. 7
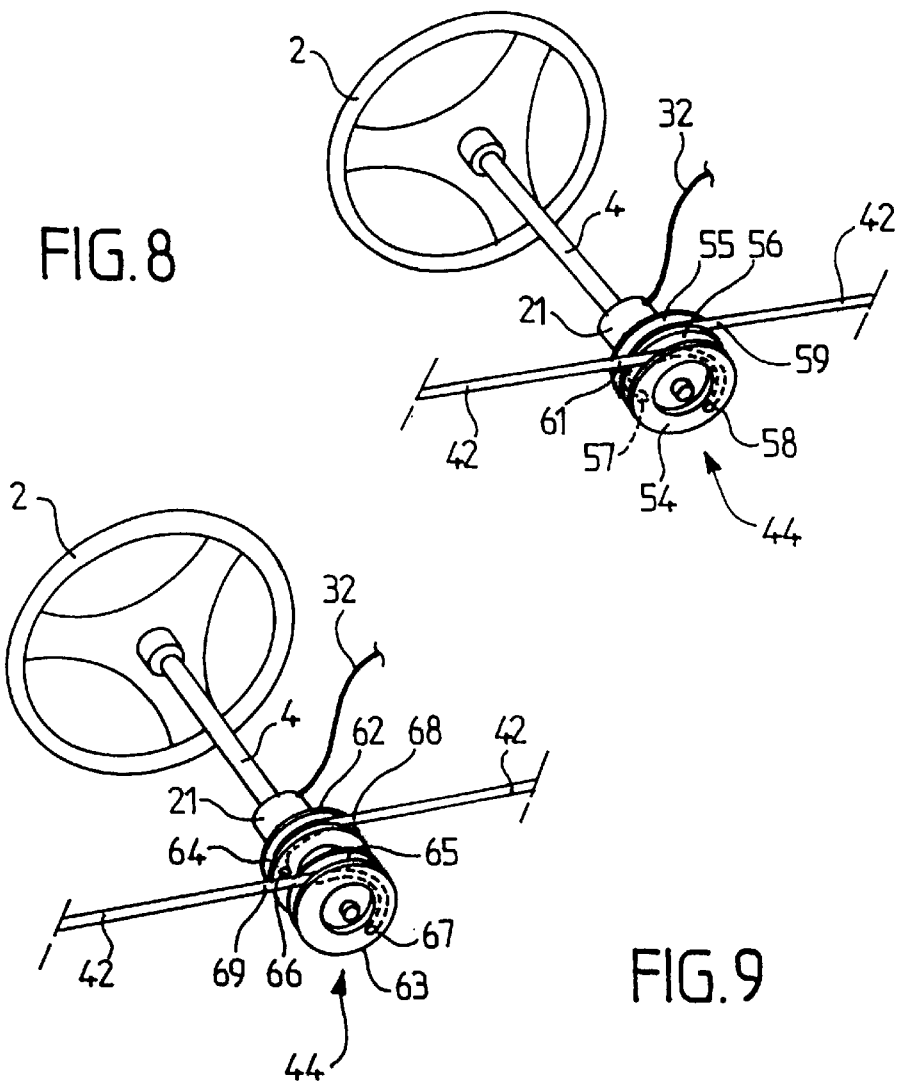
FIG. 8
FIG. 9

ELECTRICAL AND MECHANICAL STEERING SYSTEM FOR AUTOMOBILE VEHICLES

BACKGROUND OF THE INVENTION

1. Field of the Invention

The present invention relates to an electrical and mechanical system for steering the steered (i.e., steerable) wheels of an automobile vehicle. The steering system includes a steering wheel mounted on a steering column which is connected to a steering rack for the steered wheels.

2. Description of the Prior Art

In prior art steering systems as currently fitted to automobile vehicles the steering column 1 is always mechanical, as shown in FIG. 1, with an upper column part 4 carrying the steering wheel 2, the position of which is generally adjustable, and an intermediate shaft 6 between the upper column part 4 and the steering box 7 of the steering rack 3 with its rack 18 and pinion 17. The intermediate shaft 6 is connected to the upper column part 4 and to the steering box 7 by universal joints. Power steering 8 may be provided, and can be electrical. The above types of steering column have many drawbacks in terms of comfort and safety. This is because they do not have any means of returning the steering wheel to the center position. Also, the power steering is not matched to the driver. In the safety field, the above types of steering column have the major disadvantage of transferring impact to the steering wheel in the event of an accident because of the rigid connection between the steering wheel and the steered wheels.

OBJECT OF THE INVENTION

The aim of the present invention is to propose an automobile vehicle steering system which avoids the drawbacks described hereinabove and in particular those due to the rigid connection between the steering wheel and the steered wheels.

SUMMARY OF THE INVENTION

According to the invention, the automobile vehicle steering system includes a steering column, a steering wheel and a steering rack for the steered wheels of the automobile vehicle. The steering column has an upper column part and an intermediate column part. The upper column part is connected at a first end to the steering wheel and at a second end to an upper end of the intermediate column part. The intermediate column part is connected by its lower end to the steering rack for the steered wheels of the automobile vehicle.

The intermediate column part comprises two connections: a mechanical connection and an electrical connection. The mechanical connection and the electrical connection are disposed in parallel such that:

the mechanical connection is connected to the second end of the upper column part and to the steering rack, and the electrical connection is connected to the second end of the upper column part and to the steering rack.

This arrangement is accomplished so that under normal driving conditions the mechanical connection and the electrical connection function simultaneously and in the event of interruption of the electrical power supply the remaining mechanical connection is used to steer the automobile vehicle on its own.

According to the invention, the electrical connection includes:

a sensor sensing the demanded torque for steering the steered wheels, an electromechanical power converter commanding the displacement of the steering rack for the steered wheels, a central control unit connected to the torque sensor and to the electromechanical power converter, so that the central control unit receives an electrical signal from the torque sensor and analyzes the demanded torque in order to send to the electromechanical power converter an electrical command and control signal for the force furnished by the electromechanical power converter.

According to the invention, the mechanical connection includes:

a mechanical cable system, an upper connecting assembly for connecting the mechanical cable system to the upper steering column part, a lower connecting assembly for connecting the mechanical cable system to the steering rack for the steered wheels. In the electrical connection, the electromechanical power converter is either a DC electric motor with brushes, or a brushless synchronous DC electric motor, or an asynchronous AC electric motor, or a variable reluctance synchronous electric motor.

According to the invention, the electromechanical power converter can be connected to the steering rack in different ways. In one arrangement, the electric motor is connected to a pinion which drives a rack on the steering rack.

In another arrangement, the electric motor is connected to a screw and nut system, the nut is attached to the rotor of the motor and the screw is on the steering rack.

In another arrangement, the electric motor is connected to the gear of a rack-and-pinion steering box which drives a rack on the steering rack.

Advantageously, in the electrical connection, the sensor sensing the demanded torque for steering the steered wheels is on the upper steering column part. In other forms of electrical connection, the sensor sensing the demanded torque for steering the steered wheels is on the pinion of the rack-and-pinion steering box, which provides a torque closer to that demanded by the steered wheels.

To improve the electrical connection, an actuator is disposed on the upper steering column part. The actuator is adapted to provide feedback between the steered wheels and the steering wheel and it is connected to the central control unit. Preferably, the feedback actuator is an electric motor.

According to the invention, in one embodiment of the mechanical connection, the mechanical cable system includes a cable operating in traction and in compression according to the direction of rotation of the steering wheel.

In a different mechanical connection structure, the mechanical cable system includes a cable operating only in traction regardless of the direction of rotation of the steering wheel.

In a different arrangement of the mechanical connection, the mechanical cable system includes a cable operating in torsion and receiving and transmitting rotational movement of the steering wheel.

According to an embodiment of the invention, the mechanical cable system includes a traction cable on four pulleys mounted on the structure of the vehicle to form a loop which is connected to the upper connecting assembly and to the lower connecting assembly.

According to the invention, the upper connecting assembly can take various forms. In one arrangement, the upper connecting assembly comprises a pinion which meshes with a rack and is driven in rotation by the upper steering column part and the rack is attached to the mechanical cable.

In another arrangement, the upper connecting assembly consists of two take-up pulleys
which is driven in rotation by the upper steering column part,
and which has a groove receiving the corresponding end of the mechanical cable,
each cable end being attached to the groove of the corresponding pulley at a required location.

In another arrangement, the upper connecting assembly consists of a take-up pulley which is driven in rotation by the upper column part and has two grooves, each groove receives the corresponding end of the mechanical cable and each cable end is attached to the corresponding groove at the required location.

According to the invention, the lower connecting assembly can take various forms. In one arrangement, the lower connecting assembly consists of a mobile bearing fixed to the steering rack and passing through an opening in the housing of the steering rack and a fixed bearing attached to the housing of the steering rack and the end of the mechanical cable passes through the fixed bearing and is attached to the mobile bearing.

In another arrangement, the lower connecting assembly consists of a mobile bearing fixed to the steering rack and passing through an opening in the housing of the steering rack and two fixed bearings fastened to the housing of the steering rack-and on respective opposite sides of the opening and each end of the mechanical cable passes through the corresponding fixed bearing and is attached to the mobile bearing.

In another arrangement, the lower connecting assembly consists of two rack-and-pinion gears, namely a first gear with a first rack which is attached to the mechanical cable and which drives a first pinion and a second gear with a second pinion which drives a second rack attached to the steering rack, the first pinion and the second pinion are mounted on the same shaft and constrained to rotate together and the first pinion and the second pinion are such that displacement of the mechanical cable displaces the steering rack differently.

In one particularly beneficial embodiment of the mechanical connection in accordance with the invention, the mechanical cable system includes a traction cable with two runs on the same side of the vehicle and each of the two runs is connected to the upper connecting assembly and to the lower connecting assembly.

In this mechanical connection, the upper connecting assembly includes a gear whose first pinion is rotationally coupled to the upper steering column part and a sprocket meshing with a chain whose two ends are connected to corresponding upper ends of the two runs of the mechanical cable, the sprocket and the second pinion of the gear are mounted on the same shaft and constrained to rotate together and the first pinion and the second pinion are such that displacement of the mechanical cable is as small as possible for the required rotation of the steering wheel.

In this mechanical embodiment, the lower connecting assembly includes a sprocket meshing with a chain the two ends of which are connected to the corresponding lower end of two runs of the mechanical cable and the sprocket is mounted on the shaft of the pinion of the rack-and-pinion steering box.

In another embodiment, the lower connecting assembly includes a sprocket meshing with a chain whose two ends are connected to the corresponding lower end of the two runs of the mechanical cable, the sprocket is mounted on the shaft of the electric motor of the electrical connection and the electric motor drives the shaft of the pinion of the rack-and-pinion steering box.

With the above mechanical connection, the torque sensor is on the shaft of the pinion of the rack-and-pinion steering box, an actuator providing feedback between the steered wheels of the vehicle and the steering wheel is on the upper steering column part and the feedback actuator is electrically connected to the central control unit.

According to another embodiment of the invention, the mechanical cable system includes a cable operating in torsion, the upper connecting assembly consists of an end-piece at the corresponding end of the mechanical cable which has a recessed shape adapted to receive the end of the upper steering column part, the end has a projecting shape whose dimensions match the recessed shape of the end-piece, the lower connecting assembly consists of an end-piece at the corresponding end of the mechanical cable which has a recessed shape adapted to receive the end of the shaft of the pinion of the rack-and-pinion steering box and the end has a projecting shape whose dimensions match the recessed shape of the end-piece.

The electrical and mechanical steering system for automobile vehicles in accordance with the invention therefore has the advantage of no rigid mechanical connection between the steered wheels and the steering wheel. The above architecture eliminates all feedback of impact from the steered wheels to the steering wheel, which considerably improves the safety of the automobile vehicle. Also, the arrangement of the electrical connection with its central command and control unit for the force furnished by the electromechanical converter provides power steering matched to the driver and controlled return of the steering wheel to the center position.

BRIEF DESCRIPTION OF THE DRAWINGS

Further features and advantages of the invention will be apparent from the following particular description of several preferred embodiments of the invention shown in the corresponding accompanying drawings, in which:

FIG. 4 is a perspective view of the mechanical connection corresponding to FIG. 2;

FIG. 5 is a perspective view of another embodiment of the mechanical connection according to the invention;

FIG. 6 is a perspective view of one embodiment of the lower connecting assembly of the mechanical connection shown in FIGS. 4 and 5;

FIG. 7 is a perspective view of another embodiment of the lower connection assembly;

FIG. 8 is a perspective view of one embodiment of the upper connection assembly of the mechanical connection shown in FIG. 4;

FIG. 9 is a view analogous to FIG. 8 of another embodiment of the invention;

DESCRIPTION OF THE PREFERRED EMBODIMENTS

Figure 1:
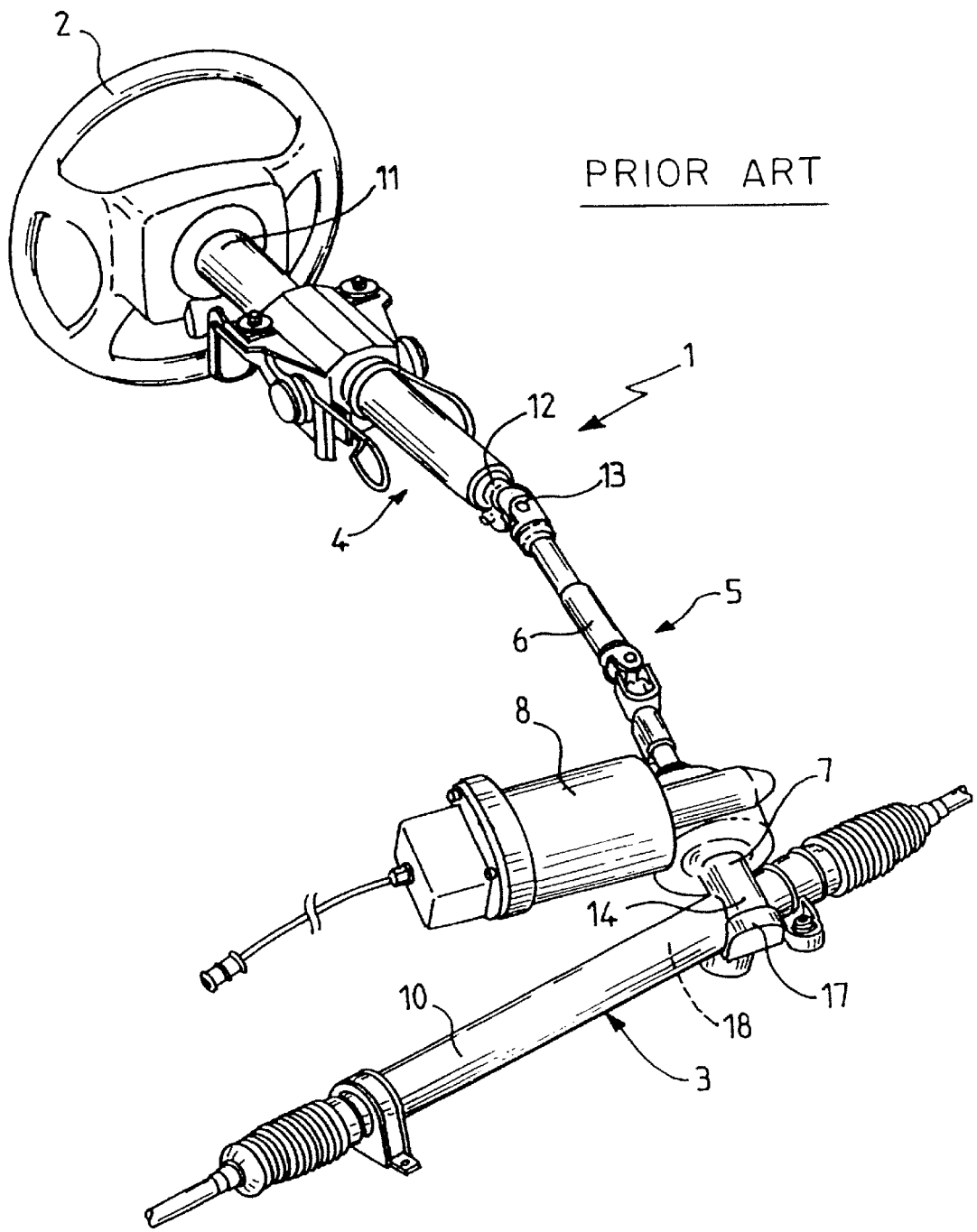
FIG. 1 is a perspective view of a prior art automobile vehicle steering column.

As shown in FIG. 1, the present invention relates to a steering system for automobile vehicles which includes a steering column 1, a steering wheel 2 and a steering rack 3. The steering rack 3 is mounted in a housing 10 which is fixed to the structure of the vehicle. The steering rack 3 controls the orientation of the steered wheels 9 of the vehicles shown in FIGS. 2 and 3.

The steering column has an upper column part 4 and an intermediate column part 5. The upper column part 4 is connected at one end 11 to the steering wheel 2. The upper column part 4 is connected at its other end 12 to the upper end 13 of the intermediate column part 5. The lower end 14 of the intermediate column part 5 is connected to the steering rack 3 for the steered wheels 9 of the automobile vehicle.

According to an essential feature of the invention shown in FIGS. 2, 3, 12, 14 and 16, the intermediate column part 5 is made up of two connections, namely a mechanical connection and an electrical connection. The mechanical connection and the electrical connection are in parallel.

The mechanical connection is connected to the end 12 of the upper column part 4 and to the steering rack 3. The electrical connection is connected to the end 12 of the upper column part 4 and to the steering rack 3.

The arrangement is such that under normal driving conditions the mechanical connection and the electrical connection function simultaneously and if the electrical power supply fails the mechanical connection remains and is used to steer the automobile vehicle on its own.

In the various embodiments of the invention described hereinafter, the electrical connection includes:
- a sensor 21 or 31 sensing the torque demanded for steering the steered wheels,
- an electromechanical power converter 22 controlling the displacement of the steering rack 3 for the steered wheels 9, and
- a central control unit 23 connected to the torque sensor 21 or 31 and to the electromechanical power converter 22.

In this electrical connection, the central control unit 23 receives an electrical signal from the torque sensor 21 or 31. The central control unit 23 analyzes the torque demanded in order to send to the electromechanical power converter 22 an electrical command and control signal governing the force applied by said electromechanical power converter 22.

The electromechanical power converter 22 in the electrical connection is a DC electric motor with brushes or a brushless synchronous DC electric motor or a variable reluctance synchronous electric motor or an asynchronous AC electric motor.

In the structures described hereinafter, the mechanical connection includes a mechanical cable system 41, 42 or 43 and two connecting assemblies.

An upper connecting assembly 44 connects the mechanical cable system 41, 42 or 43 to the upper steering column part 4. A lower connection assembly 45 connects the mechanical cable system 41, 42 or 43 to the steering rack 3 for the steered wheels 9 of the vehicle.

The upper connecting assembly 44 can be in an upper housing 46 and the lower connecting assembly 45 can be in a lower housing 47.

Figure 2:
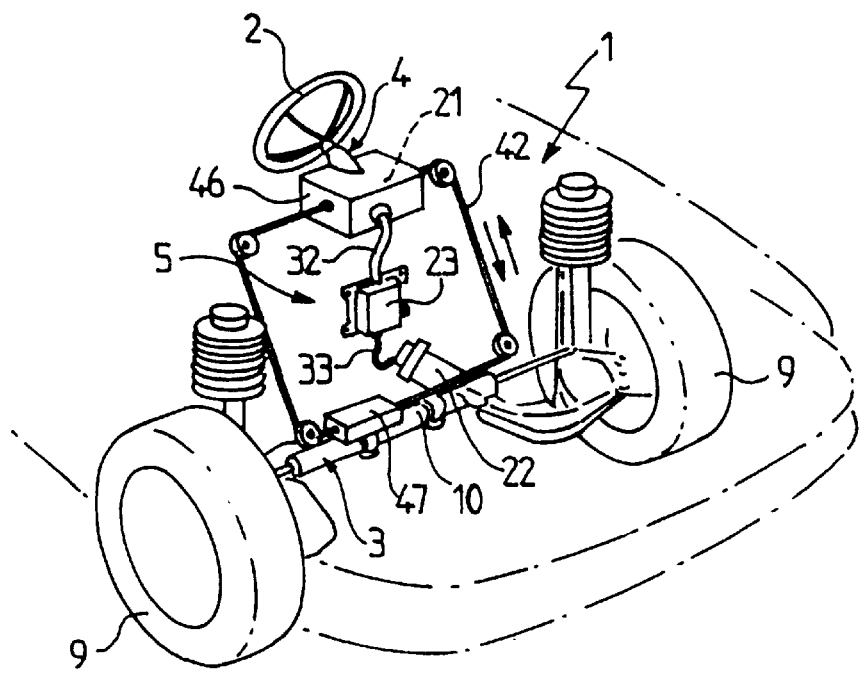
FIG. 2 is a perspective view of the automobile vehicle steering system according to the invention showing the electrical connection and the mechanical connection.

In the embodiment shown in FIGS. 2 and 4 the mechanical cable system includes a cable 42 which operates only in traction, regardless of the direction in which the steering wheel 2 is turned.

The traction cable 42 runs around four pulleys 51 which are mounted on the structure of the vehicle and forms a loop which is connected to the upper connecting assembly 44 and to the lower connecting assembly 45.

An upper housing 46 encloses the upper connecting assembly 44 and a lower housing 47 encloses the lower connecting assembly 45.

The upper connection assembly 44 includes a pinion 52 which meshes with a rack 53. The pinion 52 is driven in rotation by the upper steering column part 4 and said rack 53 is attached to the mechanical cable 42.

In an embodiment shown in FIG. 8 the upper connecting assembly 44 consists of a take-up pulley 54.

The take-up pulley 54 is driven in rotation by the upper column part 4 and has two grooves 55 and 56. Each groove 55 and 56 receives the corresponding end 59 and 61 of the mechanical cable 42.

Moreover, each end 59 and 61 is attached to the corresponding groove 55 and 56 at a corresponding required location 57 and 58.

In another embodiment, shown in FIG. 9, the upper connecting assembly 44 consists of two take-up pulleys 62 and 63. Each of the two take-up pulleys 62 and 63 is driven in rotation by the upper column part 4 and has a corresponding groove 64 and 65 which receives the corresponding end 68 and 69 of the mechanical cable 42. Each end 68 and 69 is attached to the corresponding groove 64 and 65 of the corresponding pulley 62 and 63 at a required location 66 and 67.

The lower connecting assembly 45, which is shown in FIG. 6, consists of two rack-and-pinion gears 81 and 82. A first gear 81 has a first rack 83 which is attached to the mechanical cable 42 and which drives a first pinion 84. A second gear 82 has a second pinion 86 which drives a second rack 85 which is attached to the steering rack 3. The first pinion 84 and the second pinion 86 are mounted on the same shaft 87 and are constrained to rotate together. The first and second pinions 84 and 86 are such that the displacement of the mechanical cable 42 displaces the steering rack 3 differently.

In an embodiment which is shown in FIG. 7, the lower connecting assembly 45 consists of a mobile bearing 73 and two fixed bearings 71 and 72. The mobile bearing 73 is fixed to the steering rack 3 and passes through an opening 74 in the housing 10 of the steering rack 3. The two fixed bearings 71 and 72 are attached to said housing 10 of the steering rack 3 and are disposed on respective opposite sides of the opening 74. Each end 76 and 77 of the mechanical cable 42 passes through the corresponding fixed bearing 71 and 72 and is attached to the mobile bearing 73 at 78 and 79.

In the embodiments which are shown in FIGS. 4, 8 and 9 the electrical connection includes a sensor 21 on the upper column part 4 for sensing the torque demanded for steering the steered wheels 9.

The central control unit 23 is connected to the torque sensor 21 by the conductor 32 and to the electric motor 22 by the conductor 33, as shown in FIG. 2.

Figure 10:
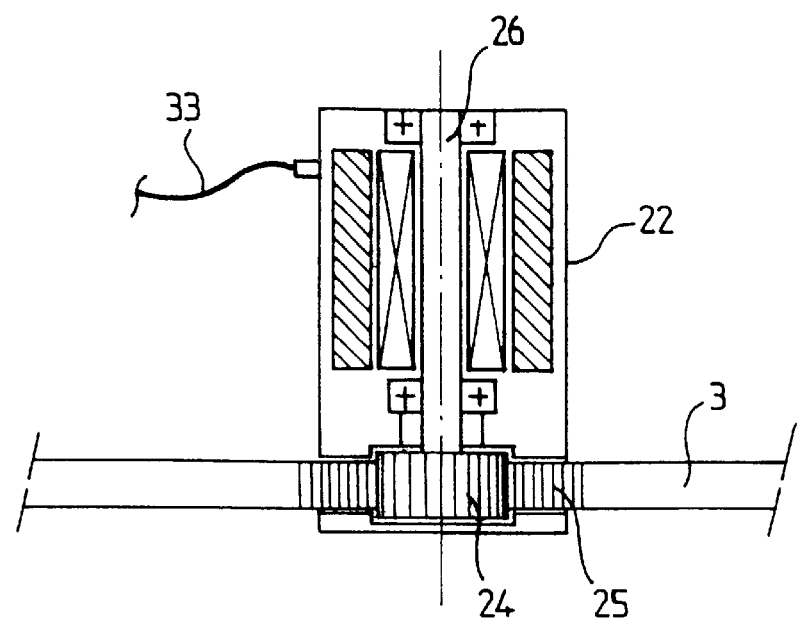
FIG. 10 is a sectional view of an electrical drive system for the steering rack according to the invention.
Figure 11:
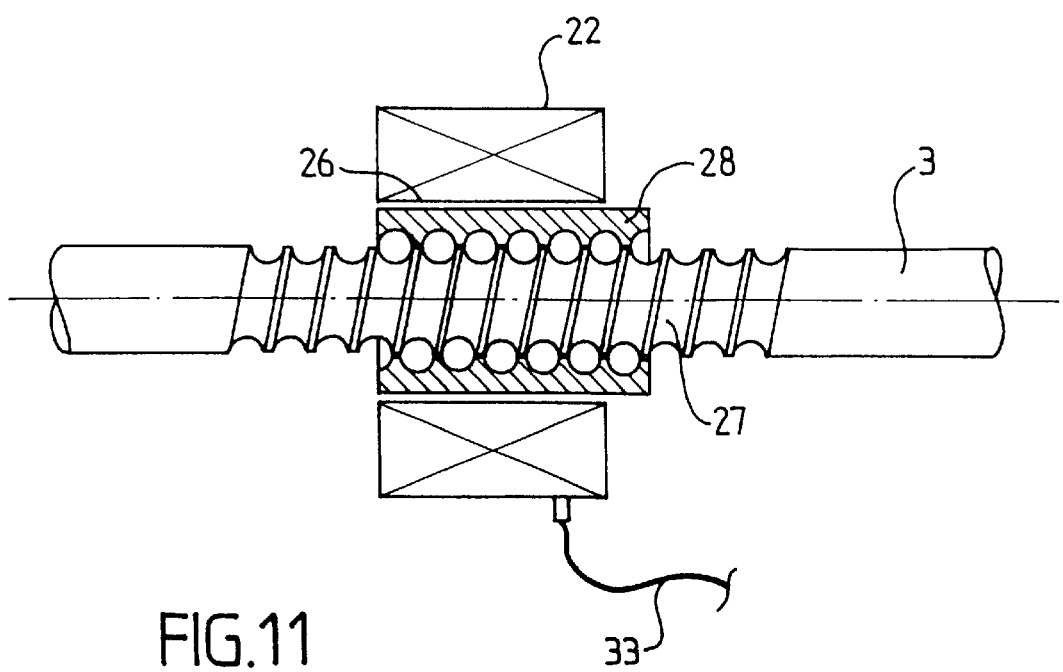
FIG. 11 is a sectional view of another embodiment of the electrical drive system.

In an embodiment shown in detail in FIG. 10 the electromechanical power converter or electric motor 22 has its rotor 26 connected to a pinion 24. The pinion 24 drives a rack 25 on the steering rack 3. In a different embodiment, shown in FIG. 11, the electric motor 22 is connected to a nut and screw system. The nut 28 is fastened to the rotor 26 of the motor 22 and the screw 27 is formed on the steering rack 3. The central control unit 23 is connected to the torque sensor 21 by the conductor 32 and to the electric motor 22 by the conductor 33, as shown in FIGS. 2, 4, 8 and 9.

Figures 12, 13:
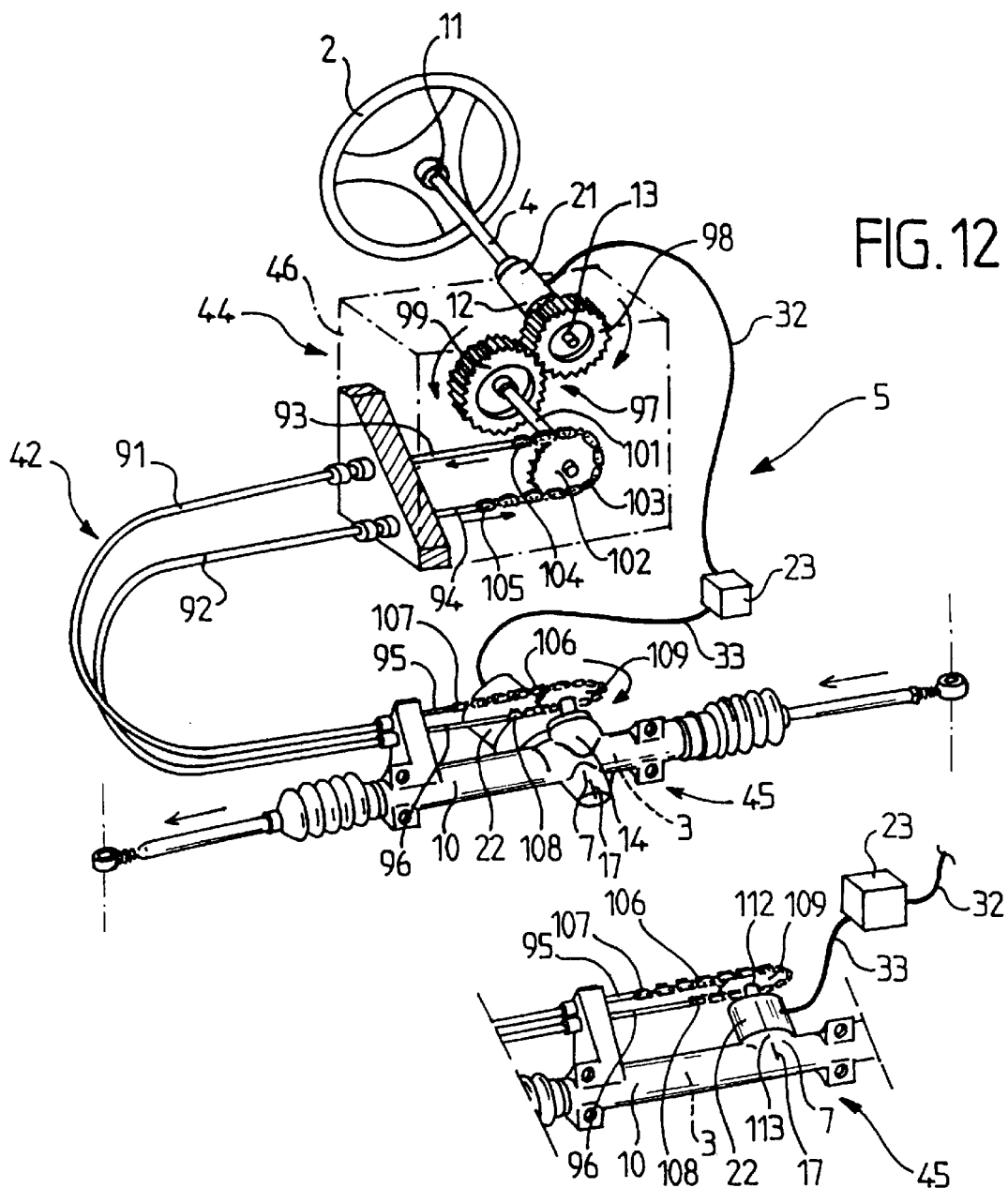
FIG. 12 is a perspective view of another embodiment of the mechanical connection according to the invention.
FIG. 13 shows a variant of the lower connection assembly shown in FIG. 12.
Figure 15:
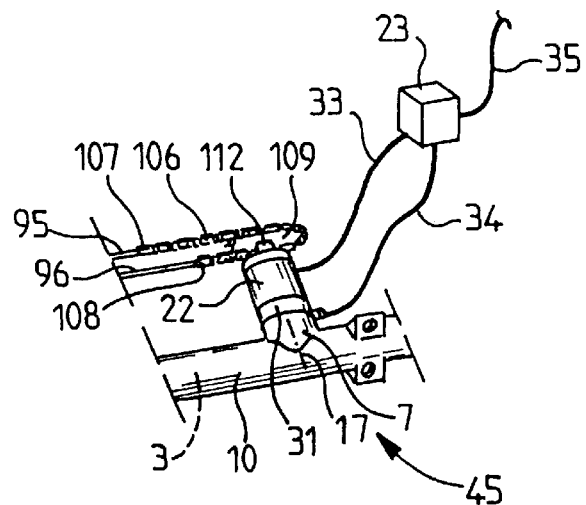
FIG. 15 shows a variant of the lower connection assembly shown in FIG. 14.

The electric motor 22 can also be connected to a pinion 17 of a steering box 7 with a rack 18 on the steering rack 3, as shown in FIGS. 13 and 15.

In the embodiment shown in FIG. 5 the mechanical cable system includes a cable 41 which operates in traction and in compression, depending on the direction of rotation of the steering wheel 2.

The upper connecting assembly 44 consists of a pinion 52 which meshes with a rack 53. The pinion 52 is driven in rotation by the upper steering column part 4 and said rack 53 is attached to the mechanical cable 41.

As shown in FIG. 7, the lower connecting assembly 45 consists of a mobile bearing 73 and a fixed bearing 71. The mobile bearing 73 is fixed to the steering rack 3 and passes through an opening 74 in the housing 10 of the steering rack 3. The fixed bearing 71 is attached to said housing 10 of the steering rack 3, the end 76 of the mechanical cable 41 passing through the fixed bearing 71 and attaching to the mobile bearing 73 and 78.

To reduce the movement of the cable 42 the lower connecting assembly 45 can be of the type shown in FIG. 6.

The lower connecting assembly 45 shown in FIG. 6 consists of two rack-and-pinion gears 81 and 82. A first gear 81 has a first rack 83 which is attached to the mechanical cable 42 and which drives a first pinion 84. A second gear 82 has a second pinion 86 which drives a second rack 85 which is attached to the steering rack 3. The first pinion 84 and the second pinion 86 are mounted on the same shaft 87 and are constrained to rotate together. The first and second pinions 84 and 86 are such that the displacement of the mechanical cable 42 displaces the steering rack 3 differently.

In FIG. 5, the electrical connection includes a sensor 21 on the upper column part 4 for sensing the torque demanded for steering the steered wheels 9.

The central control unit 23 is connected to the torque sensor 21 by the conductor 32 and to the electric motor 22 by the conductor 33, as shown in FIG. 2.

The mechanical connection shown in FIGS. 12, 13, 14 and 15 is characterized in that the mechanical cable system 42 includes a traction cable whose two runs 91 and 92 are on the same side of the vehicle with each of the two runs 91 and 92 connected to the upper connection assembly 44 and to the lower connection assembly 45.

Figure 14:
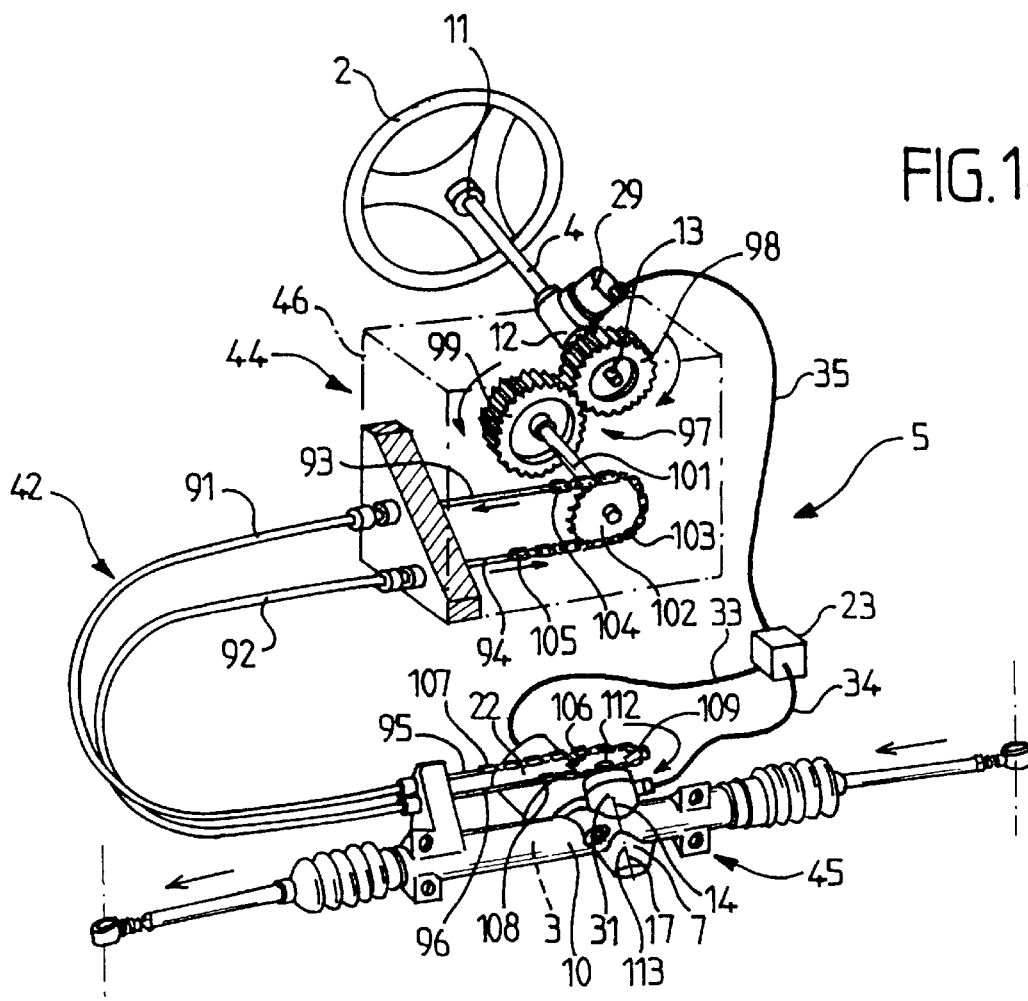
FIG. 14 is a perspective view of another embodiment of the mechanical connection according to the invention.

In the embodiment shown in FIGS. 12 and 14 the upper connecting assembly 44 includes a gear 97 whose first pinion 98 is rotationally coupled to the upper steering column part 4, a sprocket 102 meshed with a chain 103 whose two ends 104, 105 are connected to the corresponding upper ends 93, 94 of the two runs 91, 92 of the mechanical cable 42, the sprocket 102 and the second pinion 99 of the gear 97 being mounted on the same shaft 101 and constrained to rotate together, and the first and second pinions being such that the displacement of the mechanical cable is as small as possible for the required rotation of the steering wheel.

The lower connecting assembly 45 includes a sprocket 109 meshing with a chain 106 whose two ends 107, 108 are connected to the corresponding lower ends 95, 96 of the two runs 91, 92 of the mechanical cable 42, the sprocket 109 being mounted on the shaft of the pinion 17 of the rack-and-pinion steering box 7.

In the embodiment shown in FIGS. 13 and 15 the lower connecting assembly 45 includes a sprocket 109 meshing with a chain 106 whose two ends 107, 108 are connected to the corresponding lower ends 95, 96 of the two runs 91, 92 of the mechanical cable 42, the sprocket 109 being mounted on the shaft of the electric motor 22 of the electrical connection, the electric motor 22 driving the shaft of the pinion 17 of the rack-and-pinion steering box 7.

In FIGS. 12 and 13 the electrical connection includes a demanded torque sensor 21 which is mounted at the end of the upper column part 4 and which is connected to the control unit 23 by the conductor 32. The electric motor 22 is connected to the central control unit 23 by the conductor 33.

In FIGS. 14 and 15 the sensor 31 sensing the demanded torque for steering the steered wheels 9 is disposed on the pinion 17 of the rack-and-pinion steering box 7 and is electrically connected to the central control unit 23 by the conductor 34. The electric motor 22 is connected to the central control unit 23 by the conductor 33. An actuator 29 is disposed on the upper steering column part 4. The actuator 29 provides feedback between the steered wheels 9 of the vehicle and the steering wheel 2. The feedback actuator 29 is electrically connected to the central control unit 23 by the conductor 35. The feedback actuator 29 is an electric motor.

Figure 3:
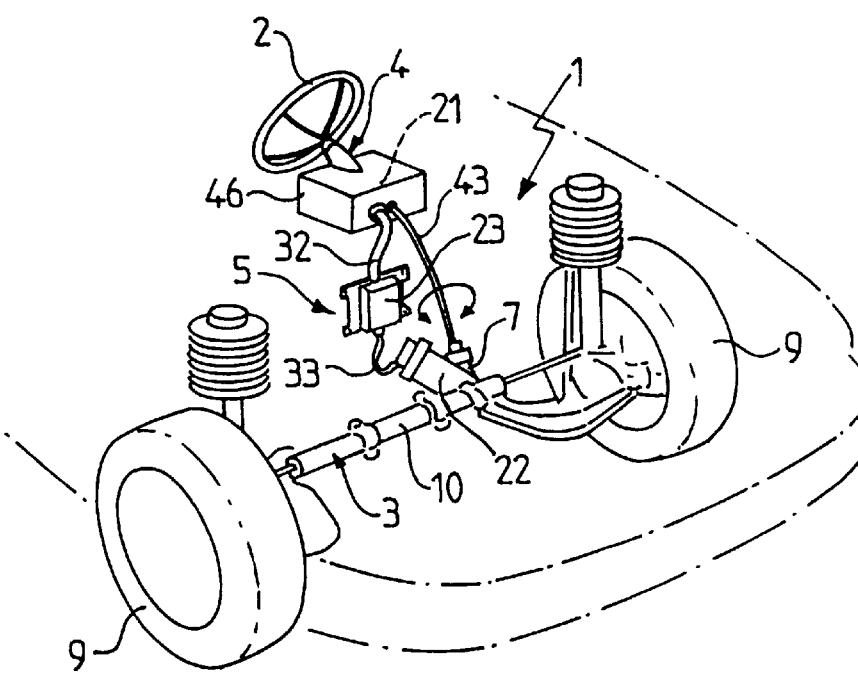
FIG. 3 is a perspective view of another embodiment of the invention.
Figure 16:
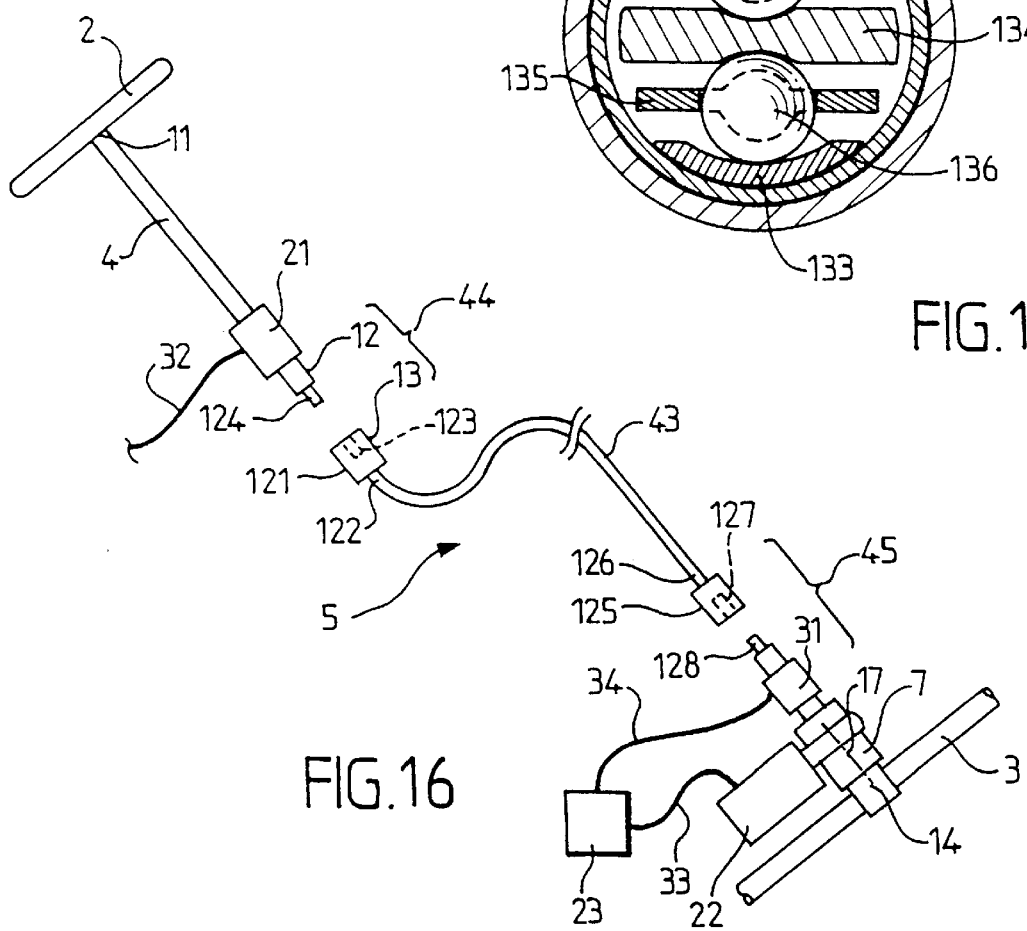
FIG. 16 is a view of another embodiment of the invention with a torsion cable.

FIGS. 3 and 16 relate to the mechanical connection in which the mechanical cable system includes a cable 43 operating in torsion, said cable 43 receiving and transmitting rotational movement of the steering wheel 2.

The mechanical cable system includes the cable 43 operating in torsion. The upper connecting assembly 44 consists of an end-piece 121 at the corresponding end 122 of the mechanical cable 43 which has a recess 123 adapted to receive the end 12 of the upper steering column part 4. Said end 12 is provided with a raised shape 124 whose dimensions match the shape of the recess 123 in the end-piece 121.

The lower connecting assembly 45 consists of an end-piece 125 at the corresponding end 126 of the mechanical cable 43 which has a recessed shape 127 adapted to receive the end of the shaft of the pinion 17 of the rack-and-pinion steering box 7. Said end has a raised shape 128 whose dimensions match the recessed shape 127 of the end-piece 125.

In an arrangement like this one, the demanded torque sensor 21 can be on the upper steering column part 4,. The central control unit 23 is connected to the torque sensor 21 by the conductor 32 and to the electric motor 22 by the conductor 33, as shown in FIG. 3.

In the arrangement shown in FIG. 16 the sensor 31 sensing the demanded torque for steering the steered wheels 9 is disposed on the pinion 17 of the rack-and-pinion steering box 7.

The central control unit 23 is connected to the torque sensor 31 by the conductor 34 and to the electric motor 22 by the conductor 33.

In accordance with the invention, the various types of electrical connection described can be associated with the various types of mechanical connection described.

Figure 17:
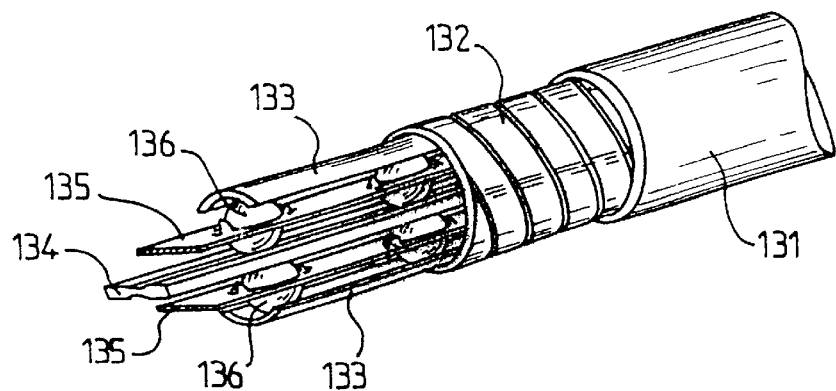
FIG. 17 is a perspective view of a traction and compression cable of a prior art embodiment; ?
Figure 18:
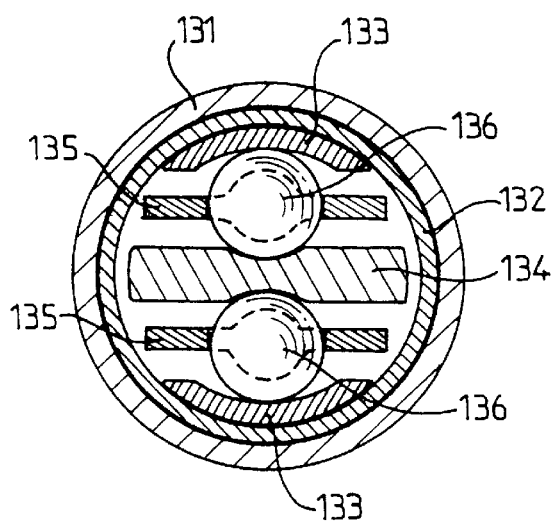
FIG. 18 is a section of the cable shown in FIG. 17.

The cable 41 which operates in traction and in compression can be of a type available off the shelf and shown in FIGS. 17 and 18.

This type of cable has two rows of balls 136 disposed between a central raceway 134 and two outer raceways 133. The balls 136 of each row are held in place relative to each other by two cages 135. The assembly is retained by a retaining sheath 132 which is surrounded by an outer sheath 131.

What we claim is:

1. A steering system for an automotive vehicle having a vehicle body, and a pair of steered wheels (9) connected for movement relative to said vehicle body, comprising:
   (a) a steering wheel (2);
   (b) lower steering rack means (3) for displacing the steered wheels relative to the vehicle chassis;
   (c) a vertical steering column (4) having an upper end connected with said steering wheel, said steering column having a lower end;
   (d) mechanical force transmitting means for transmitting a first force from said steering column lower end to said lower steering rack means, said mechanical force transmitting means including:
      (1) a non-rigid mechanical cable system;
      (2) upper cable connecting means (44) connecting said cable system with said steering column lower end; and
      (3) lower cable connecting means (45) connecting said cable system with lower said steering rack means;
      (4) said upper cable connecting means including an upper rack (53) connected. with said mechanical cable system, and a pinion (52) in enmeshing engagement with said upper rack, said pinion being rotatably driven by said steering column lower end;
      (5) said mechanical cable system including a cable (41) operable alternately in traction and in compression according to the direction of rotation of said steering wheel; and
   (e) electrical force transmitting means for transmitting a second force from said steering column lower end to said lower steering rack means, including:
      (1) operating mean including an electric motor (22) for operating said lower steering rack means;
      (2) torque sensor means (21, 31) for producing a torque signal that is function of the torque demanded of the steered wheels; and
      (3) central control means (23) for operating said electric motor as a fiction of said torque signal.

2. The system claimed in claim 1, wherein said electric motor is a DC electric motor with brushes.

3. The system claimed in claim 1, wherein said electric motor is a brushless synchronous DC electric motor.

4. The system claimed in claim 1, wherein said electric motor is an asynchronous AC electric motor.

5. The system claimed in claim 1, wherein said electric motor is a variable reluctance synchronous electric motor.

6. The system claimed in claim 1, wherein said lower steering rack operating means includes a pinion (24) connecting said electric motor with said lower steering rack means.

7. The system claimed in claim 1, wherein said electric motor includes a rotor, and fie wherein said lower steering rack operating means includes a screw (27) connected with said lower steering rack means, and a nut (28) readably conned with said screw, said nut being connected with said rotor.

8. The system claimed in clam 1, wherein said lower sling rack operating means includes a rack-and-pinon steering box having a gear connected with said electric motor, and a rack connected with said lower steering rack means.

9. The system claimed in claim 1, wherein said torque sensor means (21) is arranged adjacent said steering column upper end.

10. The system claimed in claim 8, wherein said sensor means is arranged on said pinion of said rack-and-pinion steering box.

11. The system claimed in claim 1, and further including feedback actuator means (29) adjacent said steering column upper end for providing feedback between said steered wheels and said steering wheel, and means (35) connecting said feedback actuator means with said central control unit.

12. The system claimed in claim 11, wherein said feedback actuator means is an electric motor.

13. The system claimed in claim 1, wherein said lower steering rack means includes a lower steering rack connected with the vehicle steered wheels, and a housing slidably receiving said lower steering rack, said housing being connected with the vehicle chassis, said lower connecting means including mobile bearing means fixed to said steering rack and passing through an opening contained in said steering rack housing, and a fixed bearing attached to said lower steering rack housing and to the end of said mechanical cable, said cable passing through said fixed bearing and being attached to said mobile berg.

14. The system claimed in claim 1, wherein said lower connecting means includes:
   (a) first gear means including a first rack (83) connected with said mechanical cable, and a first pinion (84) driven by said first rack;
   (b) second gear means including a second rack (85) connected with said lower steering rack means (3), and a second pinion (86) for driving said second rack;
   (c) a common shaft (87) connected coaxially between said first and second pinions, thereby causing simultaneous rotation of said first and second pinions, said first and second pinions having different radii to cause different displacements of said fist and second racks, respectively.

* * * * *